US008217924B2

(12) United States Patent
Kwak et al.

(10) Patent No.: US 8,217,924 B2
(45) Date of Patent: Jul. 10, 2012

(54) DISPLAY APPARATUS AND METHOD OF DRIVING THE SAME

(75) Inventors: Yun-Hee Kwak, Seoul (KR); Jong-Woong Chang, Cheonan-si (KR); Bo-Ra Kim, Asan-si (KR); Jeong-Il Kim, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 841 days.

(21) Appl. No.: 12/277,459

(22) Filed: Nov. 25, 2008

(65) Prior Publication Data

US 2009/0167730 A1 Jul. 2, 2009

(30) Foreign Application Priority Data

Dec. 28, 2007 (KR) ........................ 10-2007-0140488

(51) Int. Cl.
*G06F 3/038* (2006.01)

(52) U.S. Cl. ........................................ 345/204; 361/749

(58) Field of Classification Search .................. 361/749; 345/204

See application file for complete search history.

(56) References Cited

U.S. PATENT DOCUMENTS

| | | | | |
|---|---|---|---|---|
| 6,525,705 | B1 * | 2/2003 | Ishii et al. | 345/87 |
| 6,605,495 | B1 * | 8/2003 | Kuo | 438/151 |
| RE40,706 | E * | 5/2009 | Mishima et al. | 349/149 |
| 2007/0040794 | A1 * | 2/2007 | Kwak et al. | 345/100 |

FOREIGN PATENT DOCUMENTS

| | | | |
|---|---|---|---|
| KR | 1020040091919 | A | 11/2004 |
| KR | 1020070020778 | A | 2/2007 |
| KR | 1020070047950 | A | 5/2007 |

* cited by examiner

*Primary Examiner* — Nitin Patel
*Assistant Examiner* — Towfiq Elahi
(74) *Attorney, Agent, or Firm* — Cantor Colburn LLP

(57) ABSTRACT

A display apparatus includes a display panel including gate and data lines disposed thereon, and a plurality of driver integrated circuits (“ICs”) on the display panel and electrically connected to data lines. Flexible printed circuit boards (“FPCBs”) are disposed on the display panel and a printed circuit board to apply the control signal and the image signal from the printed circuit board to the driver ICs. There are less FPCBs than driver ICs. The driver ICs are divided into first and second driver groups; the data lines are divided into first and second groups of data lines. Driver ICs of the first driver group are directly connected to corresponding FPCBs, and driver ICs of the second driver group are connected to adjacent driver ICs. Each driver integrated circuit of the first driver group outputs a first repair signal to repair a data line of the first group of data lines.

17 Claims, 5 Drawing Sheets

DISPLAY APPARATUS AND METHOD OF DRIVING THE SAME

This application claims priority to Korean Patent Application No. 2007-140488, filed on Dec. 28, 2007, and all the benefits accruing therefrom under 35 U.S.C. §119, the contents of which in its entirety are herein incorporated by reference.

BACKGROUND OF THE INVENTION

1. Field of the Invention

The present invention relates to a display apparatus and a method of driving and repairing the display apparatus. More particularly, the present invention relates to a display apparatus having an improved display characteristic and an increased efficiency of a repair process, and a method of driving and repairing the display apparatus.

2. Description of the Related Art

In general, a liquid crystal display ("LCD") displays an image by controlling a light transmittance of a liquid crystal using an electric field to. The LCD includes a liquid crystal display panel in which liquid crystal cells are arranged in a matrix configuration, and a driving circuit which drives the liquid crystal display panel.

The driving circuit includes a gate driver which drives gate lines arranged in the liquid crystal display panel and a data driver which drives data lines arranged in the liquid crystal display. The gate driver and the data driver are integrated into a plurality of gate driver integrated circuits ("ICs") and a plurality of data driver ICs, respectively. The plurality of gate driver ICs and the plurality of data driver ICs are mounted on a tape carrier package ("TCP") and are attached to the liquid crystal display panel by a tape automated bonding ("TAB") method, or the plurality of gate driver ICs and the plurality of data driver ICs are mounted on the liquid crystal display panel by a chip on glass ("COG") method.

The LCD to which the chip on glass method is applied further includes a flexible printed circuit board ("FPCB") to electrically connect the liquid crystal display panel and the printed circuit board. As a number and a size of flexible printed circuit boards increase, a productivity of the LCD decreases. However, when the number and/or the size of the flexible printed circuit boards decreases, signals applied to the plurality of gate driver ICs and/or the plurality of data driver ICs are delayed, thereby deteriorating an image display quality.

BRIEF SUMMARY OF THE INVENTION

Exemplary embodiments of the present invention provide a display apparatus having an improved image display quality, productivity and efficiency of a repair process thereof.

Exemplary embodiments of the present invention also provide a method of driving the display apparatus, and a method of repairing the same.

According to an exemplary embodiment of the present invention, a display apparatus includes a display panel, a plurality of driver integrated circuits ("ICs"), a printed circuit board, and a plurality of flexible printed circuit boards. The display panel includes a plurality of gate lines and a plurality of data lines, data lines of the plurality of data lines being insulated from and intersecting gate lines of the plurality of gate lines. The gate lines are configured to receive a gate signal and the data lines are configured to receive a data signal to display an image. The driver ICs are disposed on the display panel and are electrically connected to the data lines to convert an image signal to the data signal based on a control signal.

The printed circuit board outputs the control signal that controls drive operations of the driver ICs and the image signal. Flexible printed circuit boards of the plurality of flexible printed circuit boards are attached to the display panel and the printed circuit board to apply the control signal and the image signal from the printed circuit board to the driver ICs. A total number of the flexible printed circuit boards is less than a number of the driver ICs.

The driver ICs are divided into a first driver group and a second driver group, and the data lines are divided into a first group of data lines and a second group of data lines. The driver ICs of the first driver group are directly connected to corresponding flexible printed circuit boards, and the driver ICs of the second driver group are connected to adjacent driver ICs.

A driver IC of the first driver group outputs a first repair signal to repair at least one data line of the first group of data lines corresponding to the first driver group of driver ICs, and a driver IC of the second driver group outputs outputs a second repair signal to repair at least one data line of the second group of data lines corresponding to the second driver group.

The display apparatus further includes a repair part disposed on the display panel and including a first repair line part which at least partially overlaps first ends of the data lines, and a second repair line part which at least partially overlaps opposite second ends of the data.

In an exemplary embodiment, each of the driver ICs of the first driving group includes a first repair input terminal, a second repair input terminal, a first repair output terminal and a second repair output terminal.

The first repair line part includes a plurality of first repair lines and a plurality of second repair lines.

Each of the first repair lines is electrically connected to the first repair input terminal of each of the driver ICs of the first driver group and at least partially overlaps the first ends of the data lines of the first group of data lines. Each of the second repair lines is electrically connected to a second repair input terminal of each of the driver ICs of the first driver group and at least partially overlaps the first ends of the data lines of the second group of data lines.

In another exemplary embodiment of the present invention, a method of driving a display apparatus includes receiving a control signal and an image signal with a plurality of driver ICs. The image signal is converted to a data signal by the plurality of driver ICs based on the control signal. The data signal is outputted to a plurality of data lines, and an image is displayed on the display device based on the data signal.

The method further includes dividing the plurality of driver integrated circuits into a first group of driver integrated circuits and a second group of driver integrated circuits.

When a first data line of the plurality of data lines which corresponds to a driver IC of the first driver group is disconnected, opposite ends of the first data line are connected to a first repair line branching from the driver IC of the first group which corresponds to the first data line. Thus, a first repair signal is provided to the driver IC of the first driver group connected to the first data line.

When a second data line of the plurality of data lines corresponding to a driver IC of the second driver group is disconnected, opposite ends of the second data line are connected to a second repair line branching from the driver IC of the first driver group. Thus, a second repair signal is output to the driver IC of the first group connected to the second data line.

In yet another alternative exemplary embodiment of the present invention, a display apparatus includes display panel including a plurality of gate lines, a first group of data lines and a second group of data lines disposed thereon, a first group of driver integrated circuits and a second group of driver integrated circuits mounted on the display panel and electrically connected to the first group of data lines and the second group of data lines, respectively, and a plurality of flexible printed circuit boards arranged in the display panel.

A total number of flexible printed circuit boards of the plurality of flexible printed circuit boards is less than a total number of driver integrated circuits. The first group of driver integrated circuits is directly connected to a corresponding flexible printed circuit board to output a first repair signal to a data line of the first group of data lines. The second group of driver integrated circuits outputs a second repair signal from an adjacent driver integrated circuit of the second group of driver integrated circuits to a data line of the second group of data lines.

Accordingly, a number of flexible printed circuit boards decreases in a display device according to an exemplary embodiment, thereby improving a productivity, e.g., a production efficiency, of the display apparatus. Also, a signal provided to the driver ICs is effectively prevented from being delayed, thereby improving an image display quality of the display apparatus according to an exemplary embodiment.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
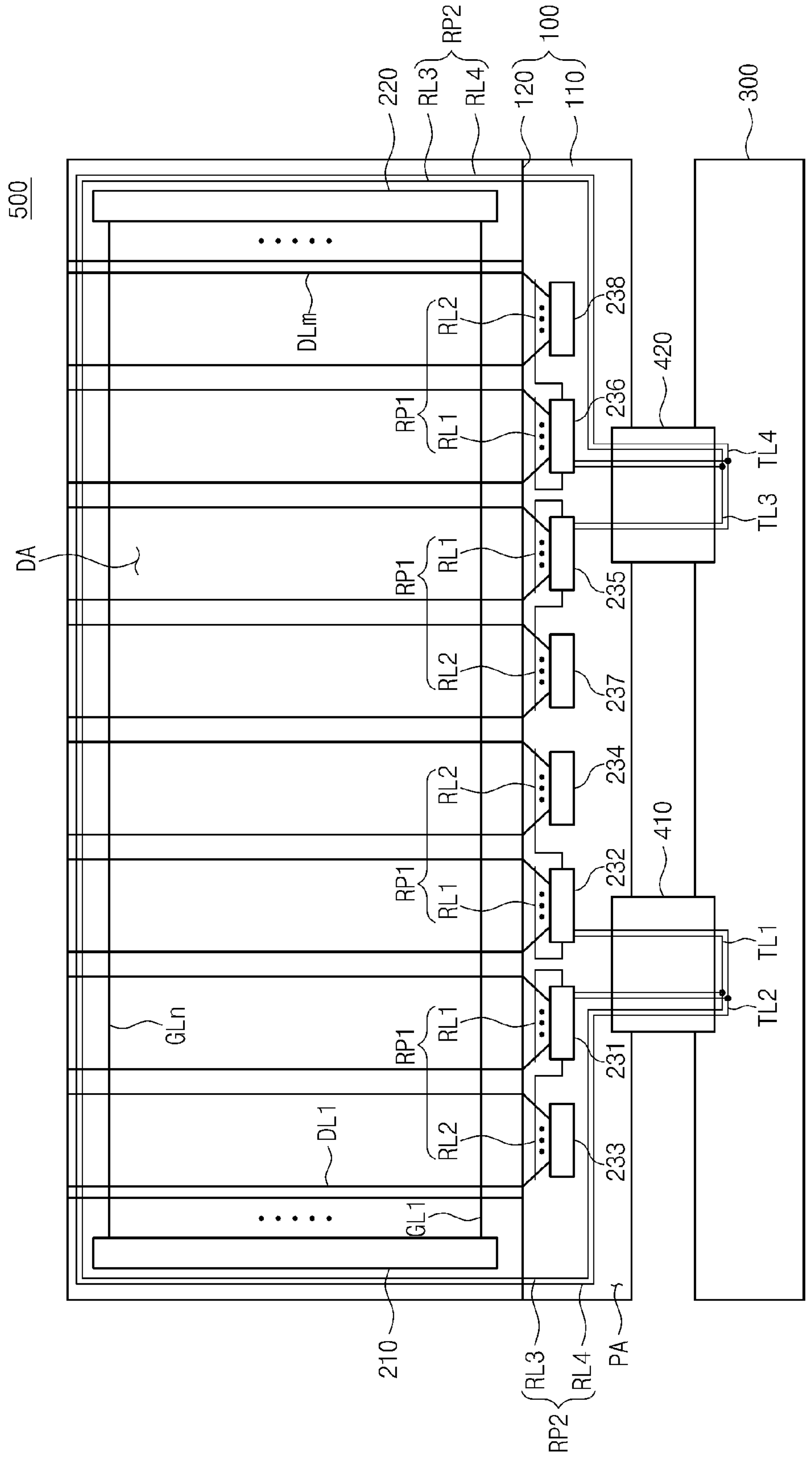
FIG. 1 is a plan view of a liquid crystal display according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper", depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
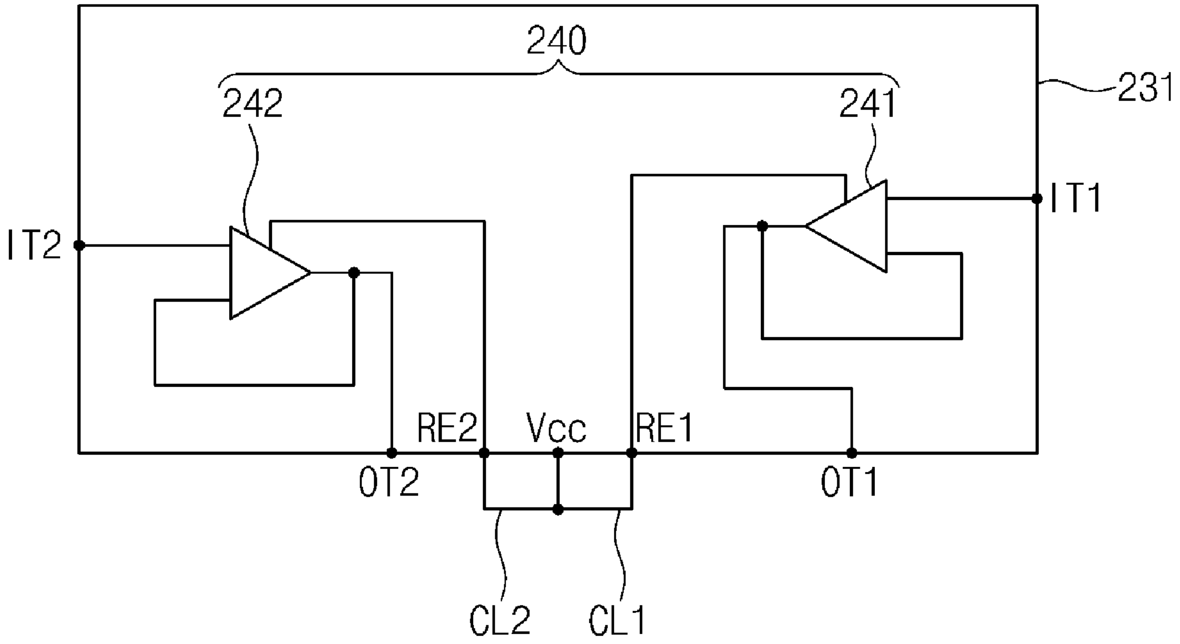
FIG. 2 is a schematic circuit diagram of an operational amplifier of a first driver integrated circuit ("IC") of the liquid crystal display according to the exemplary embodiment of the present invention shown in FIG. 1.

FIG. 1 is a plan view of a liquid crystal display according to an exemplary embodiment of the present invention, and FIG. 2 is a schematic circuit diagram of an operational amplifier of a first driver integrated circuit ("IC") of the liquid crystal display according to the exemplary embodiment of the present invention shown in FIG. 1.

Referring to FIG. 1, a liquid crystal display 500 includes a liquid crystal display ("LCD") panel 100 which displays an image thereon, a printed circuit board ("PCB") 300 disposed adjacent to the liquid crystal display panel 100, as well as a first flexible printed circuit board ("FPCB") 410 and a second flexible printed circuit board 420 which electrically connect the liquid crystal display panel 100 to the printed circuit board 300.

The liquid crystal display panel 100 includes an array substrate 110, an opposite substrate 120 substantially facing the array substrate 110 and a liquid crystal layer (not shown) interposed between the array substrate 110 and the opposite substrate 120. A plurality of pixels, each including a pixel area, is disposed in a display area DA of the array substrate 110 in a substantially matrix configuration, while a plurality of gate lines GL1~GLn and a plurality of data lines DL1~DLm are disposed in the display area DA of the array substrate 110, as shown in FIG. 1. The plurality of gate lines GL1~GLn are insulated from and substantially intersect the plurality of data lines DL1~DLm. In an exemplary embodiment of the present invention, intersections of the plurality of gate lines GL1~GLn and the plurality of data lines DL1~DL define the pixel areas, and the pixels are arranged in respective corresponding pixel areas.

Each pixel includes a thin film transistor and a pixel electrode (neither shown), and the pixel electrode is disposed to substantially face a common electrode (not shown) disposed on the opposite substrate 120. The liquid crystal layer is interposed between the pixel electrode and the common electrode. Thus, an electric field generated between the pixel electrode and the common electrode controls a light transmittance of the liquid crystal layer, and as a result, the liquid crystal display panel 100 displays an image corresponding to a desired gray-scale.

A driving circuit is disposed on the liquid crystal display panel 100. In an exemplary embodiment, the driving circuit includes a first gate driving circuit 210, a second gate driving circuit 220, and first through eighth driver integrated circuits ("ICs") 231, 232, 233, 234, 235, 236, 237 and 238, respectively. However, a number of driver ICs disposed on the liquid crystal display panel 100 is not limited to the above-described number; rather alternative exemplary embodiments may have more than or, alternatively, less than, eight driver ICs.

In an exemplary embodiment, for example, the total number of driver ICs may be equal to 2n (where n is a natural number), and the total number of flexible printed circuit board may be equal to n/2. In yet another exemplary embodiment, n is an even number greater than or equal to 4.

The first gate driving circuit 210 and the second gate driving circuit 220 are directly formed in a peripheral area PA of the array substrate 110. In an exemplary embodiment, the first gate driving circuit 210 and the second gate driving circuit 220 are formed through a thin film process is applied to form the pixels on the array substrate 110. The first gate driving circuit 210 and the second gate driving circuit 220 are disposed on the array substrate 110 to substantially face opposite ends of the opposite substrate 120, as shown in FIG. 1.

The first gate driving circuit 210 and the second gate driving circuit 220 each include a shift register (not shown) to sequentially output a gate signal. In an exemplary embodiment of the present invention, the first gate driving circuit 210 is electrically connected to first ends of the gate lines GL1~GLn, and the second gate driving circuit 220 is electrically connected to second ends of the gate lines GL1~GLn, as shown in FIG. 1. In operation of the LCD 500, the first gate driving circuit 210 and the second gate driving circuit 220 are substantially simultaneously turned on to sequentially apply the gate signal to the first end and the second end of the gate lines GL1~GLn, respectively.

In an alternative exemplary embodiment of the present invention, the first gate driving circuit 210 may be electrically connected to first ends of odd-numbered gate lines of the plurality of gate lines GL1~GLn, and the second gate driving circuit 220 may be electrically connected to second ends of even-numbered gate lines of the plurality of gate lines GL1~GLn.

The first through eighth driver ICs 231, 232, 233, 234, 235, 236, 237 and 238, respectively, are disposed in the peripheral area PA of the array substrate 110 and are electrically connected to first ends of the data lines DL1~DLm, as shown in FIG. 1, to provide a data signal to the data lines DL1~DLm.

The printed circuit board 300 includes a control circuit which controls a drive operation of the first gate driving circuit 210 and the second gate driving circuit 220 and the first though eighth driver ICs 231, 232, 233, 234, 235, 236, 237 and 238, respectively. Therefore, the printed circuit board 300 outputs a gate control signal which controls the drive of the first gate driving circuit 210 and the second gate driving circuit 220, a data control signal which controls the drive of the first through eighth driver ICs 231, 232, 233, 234, 235, 236, 237 and 238, respectively, and an image signal.

First ends of the first flexible printed circuit board 410 and the second flexible printed circuit board 420 are attached to the liquid crystal display panel 100, and second ends of the first flexible printed circuit board 410 and the second flexible printed circuit board 420 are attached to the printed circuit board 300, as shown in FIG. 1. Accordingly, the gate control signal, the data control signal and the image signal outputted from the printed circuit board 300 are transmitted to the liquid crystal display panel 100 via the first flexible printed circuit board 410 and the second flexible printed circuit board 420. Specifically, the first flexible printed circuit board 410 transmits the data control signal which controls the drive of the first through fourth driver ICs 231, 232, 233 and 234 of the first through eighth driver ICs 231, 232, 233, 234, 235, 236, 237 and 238, respectively, and the image signal, while the second flexible printed circuit board 420 transmits the data control signal which controls the drive of the fifth through eighth driver ICs 235, 236, 237 and 238 of the first through eighth driver ICs 231, 232, 233, 234, 235, 236, 237 and 238, respectively, and the image signal.

The first through eighth driver ICs 231, 232, 233, 234, 235, 236, 237 and 238, respectively, convert the image signal to the data signal in response to the data control signal and provide the data signal to corresponding data lines DL which are connected to the first through eighth driver ICs 231, 232, 233, 234, 235, 236, 237 and 238, respectively.

In an exemplary embodiment of the present invention, there are fewer flexible printed circuit boards than driver ICs, e.g., a number of the flexible printed circuit boards is less than a number of the driver ICs. Therefore, each flexible printed circuit board transmits a signal to only two adjacent driver ICs of corresponding driver ICs, and the remaining two driver ICs receive the signal from respective adjacent driver ICs. Since there are fewer flexible printed circuit boards than driver ICs, the number of the flexible printed circuit boards in the LCD 500 according to an exemplary embodiment is reduced relative to an LCD of the prior art. Therefore, a manufacturing cost of the liquid crystal display 500 is substantially reduced and a productivity, e.g., a production efficiency, of the liquid crystal display 500 is thereby improved.

In an exemplary embodiment, a number of the driver ICs which correspond to each flexible printed circuit board may be limited to approximately 4 or approximately 6, in order to prevent a delay of signal transmissions which may degrade a display quality of the liquid crystal display 500.

The liquid crystal display 500 according to an exemplary embodiment of the present invention further includes a repair part which repairs the data lines DL1~DLm disposed on the liquid crystal display panel 100.

Still referring to FIGS. 1 and 2, the repair part includes a plurality of first repair line parts RP1 and a plurality of second repair line parts RP2. Each of the first, second, fifth and sixth driver ICs 231, 232, 235 and 236, respectively, of the first through eighth driver ICs 231, 232, 233, 234, 235, 236, 237 and 238, respectively, includes a first repair line part RP1 (FIG. 1) of the plurality of first repair line parts RP1, as well as a first repair input terminal IT1 (FIG. 2), a second repair input terminal IT2 (FIG. 2), a first repair output terminal OT1 (FIG. 2) and a second repair output terminal OT2 (FIG. 2).

Each first repair line part RP1 includes a plurality of first repair lines RL1 and a plurality of second repair lines RL2. Each first repair line RL1 of the plurality of first repair lines RL1 is electrically connected to the first repair input terminal IT1 of a corresponding driver IC of the first, second, fifth and sixth driver ICs 231, 232, 235 and 236, respectively, and crosses the first ends of the data lines DL1~DLm connected to the corresponding driver IC, as shown in FIG. 1. Each second repair line RL2 of the plurality of second repair lines RL2 is electrically connected to the second repair input terminal IT2 of the corresponding driver IC and crosses the first ends of the data lines DL1~DLm which are connected to a closest driver IC from the corresponding driver IC of the third, fourth, seventh and eighth driver ICs 233, 234, 237 and 238, respectively.

In a repair process according to an exemplary embodiment, when a data line, of the plurality of data lines DL1~DLm, which crosses the first repair line RL1 and the second repair line RL2 is disconnected, the first repair line RL1 and the second repair line RL2 are electrically connected to the first end of the disconnected data line.

The second repair line part RP2 includes a third repair line RL3 and a fourth repair line RL4. The third repair line RL3 and the fourth repair line RL4 are disposed substantially around an outer periphery of the display area DA of the liquid crystal display panel 100 in the peripheral area PA in which the first through eighth driver ICs 231, 232, 233, 234, 235, 236, 237 and 238, respectively, are disposed, and cross second ends of the data lines DL1~DLm, as shown in FIG. 1.

The third repair line RL3 and the fourth repair line RL4 are electrically connected to a second end of a data line which is electrically connected to one of the first repair line RL1 and the second repair line RL2.

As shown in FIG. 2, the repair part includes a plurality of amplifiers 240 included in each of the first, second, fifth and sixth driver ICs 231, 232, 235 and 236, respectively. The plurality of amplifiers 240 included in the first, second, fifth and sixth driver ICs 231, 232, 235 and 236, respectively, each have substantially the same circuit configuration. Accordingly, only the amplifier 240 which is included in the first driver IC 231, shown in FIG. 1, will be described with reference to FIG. 2, and any repetitive detailed description of the amplifiers 240 included in the second, fifth and sixth driver ICs 232, 235 and 236, respectively, will be omitted.

As shown in FIG. 2, the amplifier 240 included in the first driver IC 231 includes a first operational amplifier ("op-amp") 241 and a second op-amp 242.

The first op-amp 241 includes an input terminal connected to the first repair input terminal IT1 of the first driver IC 231, an output terminal connected to the first repair output terminal OT1 of the first driver IC 231, and an enable terminal connected to a first repair enable terminal RE1 of the first driver IC 231. The first repair enable terminal RE1 is electrically connected to a driving voltage terminal VCC of the first driver IC 231 through a first connection line CL1. The first op-amp 241 further includes a feedback terminal connected to the output terminal thereof When the first repair line RL1 connected to the first repair input terminal IT1 is electrically connected to the first end of the disconnected data line, the first op-amp 241 receives a data signal applied to the first end of the disconnected data line.

Conversely, when the first repair line RL1 connected to the first repair input terminal IT1 is not electrically connected to the data lines DL1~DLm, the first connection line CL1 electrically connects the driving voltage terminal VCC to the first repair enable terminal RE1. Thus, a driving voltage is applied to the enable terminal of the first op-amp 241 to disable the first op-amp 241. However, when the first repair line RL1 connected to the first repair input terminal IT1 is electrically connected to the disconnected data line in the repair process, the first connection CL1 which electrically connects the driving voltage terminal VCC and the first repair enable terminal RE1 is cut using, e.g., a laser cutting process.

Accordingly, the first op-amp 241 becomes enabled, and as a result, the first op-amp 241 amplifies the data signal received through the first repair input terminal IT1 and outputs the amplified data signal through the output terminal. Since the output terminal of the first op-amp 241 is electrically connected to the first repair output terminal OT1 of the first driver IC 231, the amplified data signal (e.g., a repair signal) is applied to the third repair line RL3 through the first repair output terminal OT1.

Still referring to FIG. 2, the second op-amp 242 includes an input terminal connected to the second repair input terminal IT2 of the first driver IC 231, an output terminal connected to the second repair output terminal OT2 of the first driver IC 231, and an enable terminal connected to a second repair enable terminal RE2 of the first driver IC 231. The second repair enable terminal RE2 is electrically connected to the driving voltage terminal VCC of the first driver IC 231 through a second connection line CL2. The second op-amp 242 further includes a feedback terminal connected to the output terminal thereof.

When the second repair line RL2 connected to the second repair input terminal IT2 is electrically connected to the first end of the disconnected data line, the second op-amp 242 receives the data signal applied to the first end of the disconnected data line.

However, when the second repair line RL2 connected to the second repair input terminal IT2 is not electrically connected to the data lines DL1~DLm, the second connection line CL2 electrically connects the driving voltage terminal VCC and the second repair enable terminal RE2. Thus, the driving voltage is applied to the enable terminal of the second op-amp 242 to disable the second op-amp 242. Further, when the second repair line RL2 connected to the second repair input terminal IT2 is electrically connected to the disconnected data line through the repair process, the second connection CL2 which electrically connects the driving voltage terminal VCC and the second repair enable terminal RE2 is cut, e.g., through the laser cutting process.

Accordingly, the second op-amp 242 becomes enabled, and the second op-amp 242 amplifies the data signal received through the second repair input terminal IT2 and outputs the amplified data signal through the output terminal. Since the output terminal of the second op-amp 242 is electrically connected to the second repair output terminal OT2 of the first driver IC 231, the amplified data signal (e.g., the repair signal) is applied to the fourth repair line RL4 through the second repair output terminal OT2.

Referring again to FIG. 1, the repair part further includes a first via line TL1 which electrically connects the third repair line RL3 and the first repair output terminals OT1 of the first and second driver ICs 231 and 232, respectively, and a second via line TL2 which electrically connects the fourth repair line RL4 and the second repair output terminals OT2 of the first and second driver ICs 231 and 232, respectively.

As shown in FIG. 1, the first via line TL1 extends from the third repair line RL3 and the first repair output terminals OT1 of the first and second driver ICs 231 and 232, respectively, to the printed circuit board 300 via the first flexible printed circuit board 410, and the first via line TL1 thereby electrically connects the third repair line RL3 and the first repair output terminals OT1 of the first and second driver ICs 231 and 232, respectively, on the printed circuit board 300.

Likewise, since the second via line TL2 extends from the fourth repair line RL4 and the second repair output terminals OT2 of the first and second driver ICs 232 and 232, respectively, to the printed circuit board 300 via the first flexible printed circuit board 410, the second via line TL2 electrically connects the fourth repair line RL4 and the second repair output terminals OT2 of the first and second driver ICs 231 and 232, respectively, on the printed circuit board 300.

The repair part further includes a third via line TL3 which electrically connects the third repair line RL3 and the first repair output terminals OT1 of the fifth and sixth driver ICs 235 and 236 and a fourth via line TL4 which electrically connects the fourth repair line RL4 and the second repair output terminals OT2 of the fifth and sixth driver ICs 235 and 236.

Since the third via line TL3 extends from the third repair line RL3 and the first repair output terminals OT1 of the fifth and sixth driver ICs 235 and 236, respectively, to the printed circuit board 300 via the second flexible printed circuit board 420, the third via line TL3 electrically connects the third repair line RL3 and the first repair output terminals OT1 of the fifth and sixth driver ICs 235 and 236, respectively, on the printed circuit board 300.

Similarly, the fourth via line TL4 extends from the fourth repair line RL4 and the second repair output terminals OT2 of the fifth and sixth driver ICs 235 and 236, respectively, to the printed circuit board 300 via the second flexible printed circuit board 420, and the fourth via line TL4 therefore electrically connects the fourth repair line RL4 and the second repair output terminals OT2 of the fifth and sixth driver ICs 235 and 236, respectively, on the printed circuit board 300.

Figure 3:
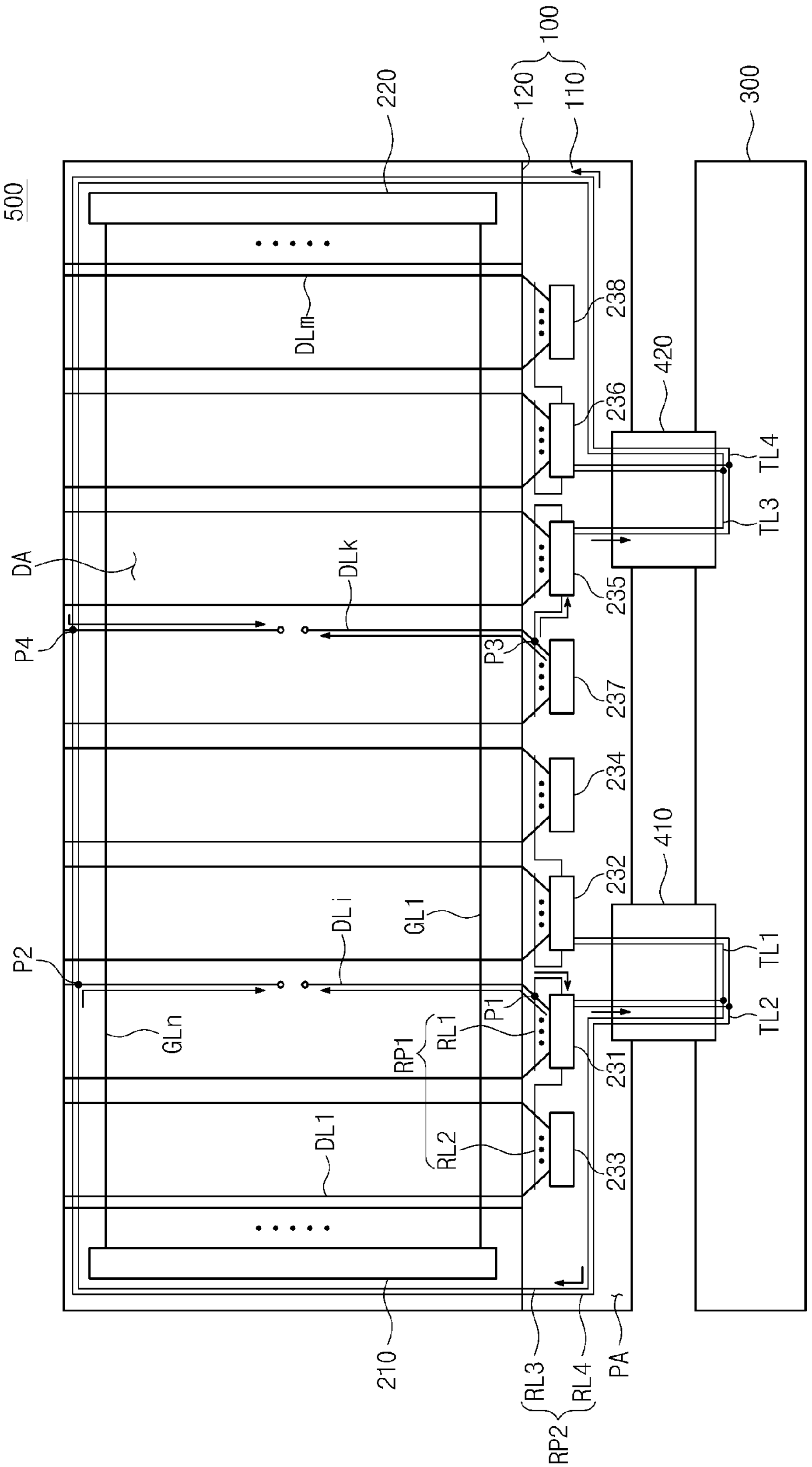
FIG. 3 is a plan view illustrating a repair process of the liquid crystal display according to the exemplary embodiment of the present invention shown in FIG. 1.

FIG. 3 is a plan view illustrating a repair process of the liquid crystal display according to the exemplary embodiment of the present invention shown in FIG. 1.

In FIG. 3, an exemplary embodiment of the present invention in which a repair process repairs one disconnected data line (e.g., i-th data line DLi) of the plurality of data lines DL1~DLm connected to the first driver IC 231, but alternative exemplary embodiments are not limited thereto. Thus, repair of the i-th data line DLi will be now be described for purposes of illustration only. In FIG. 3., arrows indicate directions of signal paths therein.

Referring to FIG. 3, a first end of the disconnected i-th data line DLi is electrically connected to the first repair line RL1 that crosses the i-th data line DLi at a first point P1. More specifically, a laser beam, for example, is irradiated onto the first point P1 at which the i-th data line DLi crosses the first repair line RL1, and the i-th data line DLi is thereby electrically connected to the first repair line RL1. Also, a second end of the i-th data line DLi is electrically connected to the third repair line RL3 which crosses the i-th data line DLi at a second point P2. Specifically, when the laser beam is irradiated onto the second point P2 at which the i-th data line DLi crosses the third repair line RL3, the i-th data line DLi is electrically connected to the third repair line RL3.

After the repair process described above, the first driver IC 231 connected to the i-th data line DLi outputs a corresponding data signal to the i-th data line DLi to display an image. The data signal applied to the i-th data line DLi is provided to the first repair line RL1 through the first point P1. Thus, the data signal is inputted to the first repair input terminal IT1 (see FIG. 2) of the first driver IC 231 via the first repair line RL1. The first driver IC 231 amplifies the data signal input through the first op-amp 241 and outputs a first repair signal through the first repair output terminal OT1 (FIG. 2). The first repair signal output from the first repair output terminal OT1 is provided to the third repair line RL3 via the first via line TL1 and applied to the second end of the i-th data line DLi through the second point P2.

Accordingly, even though the i-th data line DLi is separated into two parts due to the line disconnection, the separated two parts of the i-th data line DLi are electrically connected to each other through the first repair line RL1 and the third repair line RL3, as shown in FIG. 3. As a result, the data signal applied to pixels connected to i-th data line DLi, despite the line disconnection of the i-th data line DLi, thereby effectively preventing an occurrence of a line-shaped defect, for example, in the liquid crystal display panel 100 according to an exemplary embodiment of the present invention.

Still referring to FIG. 3, a k-th data line DLk, associated with the seventh driver IC 237 is also disconnected, e.g., after the i-th data line DLi is repaired as described above.

In a repair process of the LCD 500 according to an exemplary embodiment, a first end of the disconnected k-th data line DLk is electrically connected to the second repair line RL2 which crosses the k-th data line DLk at a third point P3, while a second end of the k-th data line DLk is electrically connected to the fourth repair line RL4 which crosses the k-th data line DLk at a fourth point P4, in a similar manner as discusses above with respect to the i-th data line DLi.

After the repair process for the k-th data line DLk is completed, the seventh driver IC 237 connected to the k-th data line DLk outputs a corresponding data signal to the k-th data line DLk in order to display an image. The data signal applied to the k-th data line DLk is provided to the second repair line RL2 through the third point P3. Accordingly, the data signal is input to the second repair input terminal IT2 (FIG. 2) of the fifth driver IC 235 via the second repair line RL2. The fifth driver IC 235 amplifies the data signal and outputs a second repair signal through the second repair output terminal OT2. The second repair signal output from the second repair output terminal OT2 is then provided to the fourth repair line RL4 via the second via line TL2 and is thereafter applied to a second end of the k-th data line DLk through the fourth point P4.

Thus, even when the k-th data line DLk is separated into two parts, the separated two parts of the k-th data line DLk are electrically connected to each other through the second repair line RL2 and the fourth repair line RL4. As a result, the data signal is applied to pixels connected to the k-th data line DLk, thereby effectively preventing an occurrence of a line-shaped defect, for example in the liquid crystal display panel 100 of the LCD 500 according to an exemplary embodiment.

Thus, the liquid crystal display panel 100 designed to have the repair structure according to an exemplary embodiment as described in FIG. 3 may repair defects in up to two data lines DL.

Figure 4:
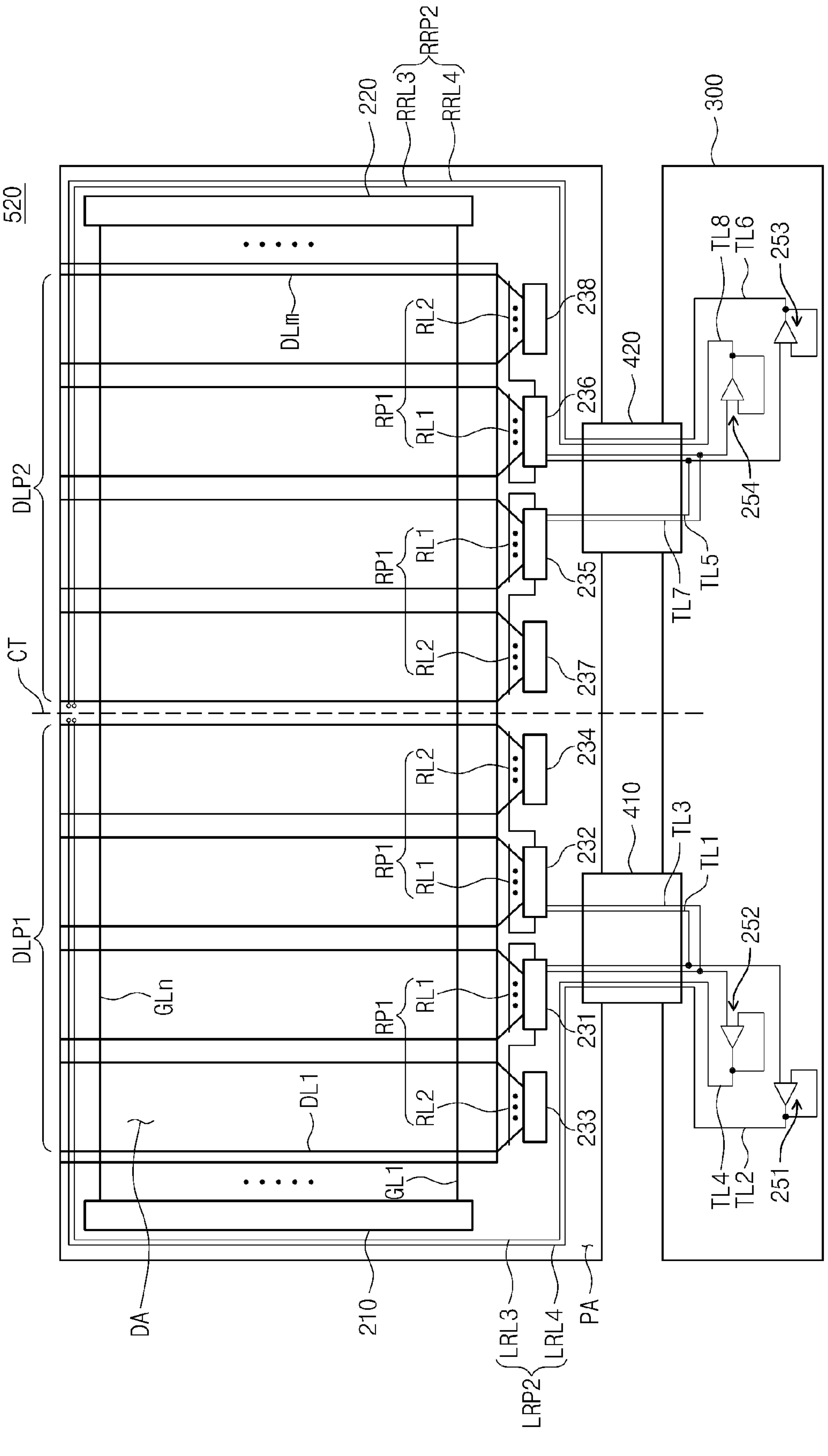
FIG. 4 is a plan view of a liquid crystal display according to an alternative exemplary embodiment of the present invention.

FIG. 4 is a plan view of a liquid crystal display according to an alternative exemplary embodiment of the present invention. In FIG. 4, the same reference numerals denote the same or like elements as in FIG. 1, and thus any repetitive detailed description thereof will hereinafter be omitted.

Referring to FIG. 4, a liquid crystal display 520 includes a repair part which repairs data lines DL1~DLm disposed in a liquid crystal display panel 100.

The repair part includes a first repair line part RP1 and a second repair line part RP2. Each of first, second, fifth and sixth driver ICs 231, 232, 235 and 236, respectively, of first through eighth driver ICs 231, 232, 233, 234, 235, 236, 237 and 238, respectively, includes a first repair input terminal, a second repair input terminal, a first repair output terminal and a second repair output terminal, as described in greater detail above with reference to FIG. 2.

The first repair line part RP1 includes a plurality of first repair lines RL1 and a plurality of second repair lines RL2. Each first repair line RL1 of the plurality of first repair lines RL1 is electrically connected to a first repair input terminal of a corresponding driver IC among the first, second, fifth and sixth driver ICs 231, 232, 235 and 236, respectively, and crosses first ends of the data lines DL connected to the corresponding driver IC. Each second repair line RL2 of the plurality of second repair lines RL2 is electrically connected to a second repair input terminal of the corresponding driver IC and crosses first ends of the data lines DL connected to a driver IC which is immediately adjacent to the corresponding driver IC among third, fourth, seventh and eighth driver ICs 233, 234, 237 and 238, respectively.

The second repair line part RP2 includes a left-side repair line part LRP1 disposed on a left side of the liquid crystal display panel 100 with respect to a center line CT which defines a plane positioned in the middle of the display panel 100, e.g., a plane which is perpendicular to the display panel 100 as arranged in FIG. 4 and which approximately bisects a cross-section of the display panel 100, as shown in FIG. 4, and a right-side repair line part RRP2 disposed on a right side of the liquid crystal display panel 100 with respect to the center line CT. The left-side repair line part LRP2 and the right-side repair line part RRP2 are electrically insulated from each other. Also, the left-side repair line part LRP2 repairs a first data line group DLP1 including data lines disposed on the left side of the center line CT of the liquid crystal display panel 100, and the right-side repair line part RRP2 repairs a second data line group DLP2 including data lines disposed on the right side of the center line CT of the liquid crystal display panel 100.

The left-side repair line part LRP2 includes a third repair line LRL3 and a fourth repair line LRL4. The third repair line LRL3 and the fourth repair line LRL4 are disposed substantially around an outer periphery of a display area DA of the liquid crystal display panel 100 in a peripheral area PA in which the first through eighth driver ICs 231, 232, 233, 234, 235, 236, 237 and 238, respectively, are disposed to cross the second ends of the data lines DL of the first data line group DLP1.

The right-side repair line part RRP2 includes a fifth repair line RRL3 and a sixth repair line RRL4. The fifth repair line RRL3 and the sixth repair line RRL4 are disposed substantially around an outer periphery of the display area DA of the liquid crystal display panel 100 in the peripheral area PA in which the first through eighth driver ICs 231, 232, 233, 234, 235, 236, 237 and 238, respectively, are disposed to cross the second ends of the data lines DL included in the second data line group DLP2.

The repair part further includes a first op-amp 251, a second op-amp 252, a third op-amp 253 and a fourth op-amp 254 disposed on the printed circuit board 300.

The first op-amp 251 and the second op-amp 252 are electrically connected to both the first driver IC 231 and the second driver IC 232 through a first flexible printed circuit board 410. More specifically, an input terminal of the first op-amp 251 is electrically connected to a first via line TL1 electrically connected to first repair output terminals of each of the first driver IC 231 and the second driver IC 232, and an output terminal of the first op-amp 251 is electrically connected to the fourth repair line LRL4 through a second via line TL2. An input terminal of the second op-amp 252 is electrically connected to a third via line TL3 electrically connected to the second repair output terminals of the first driver IC 231 and the second driver IC 232, and an output terminal of the second op-amp 252 is electrically connected to the third repair line LRL3 through a fourth via line TL4.

Thus, the first via line TL1 and the third via line TL3 extend from the liquid crystal display panel 100 to the printed circuit board 300 via the first flexible printed circuit board 410, to electrically connect the first op-amp 251 and the second op-amp 252 disposed on the printed circuit board 300 with the first driver IC 231 and the second driver IC 232 disposed on the liquid crystal display panel 100, as shown in FIG. 4.

The second via line TL2 and the fourth via line TL4 extend from the liquid crystal display panel 100 to the printed circuit board 300 via the first flexible printed circuit board 410 to electrically connect the first op-amp 251 and the second op-amp 252 to the fourth repair line LRL4 and the third repair line LRL3, respectively.

The third op-amps 253 and the fourth op-amp 254 are electrically connected to both the fifth driver IC 235 and the sixth driver IC 236 through a second flexible printed circuit board 420. Specifically, an input terminal of the third op-amp 253 is electrically connected to a fifth via line TL5 electrically connected to first repair output terminals of the fifth driver IC 235 and the sixth driver IC 236, and an output terminal of the third op-amp 253 is electrically connected to the sixth repair line RRL4 through a sixth via line TL6. An input terminal of the fourth op-amp 254 is electrically connected to a seventh via line TL7 electrically connected to the second repair output terminals of the fifth driver IC 235 and the sixth driver IC 236, and an output terminal of the fourth op-amp 254 is electrically connected to the fifth repair line RRL3 through an eighth via line TL8.

Thus, the fifth via line TL5 and the seventh via line TL7 extend from the liquid crystal display panel 100 to the printed circuit board 300 via the second flexible printed circuit board 420 to electrically connect the third op-amp 253 and the fourth op-amp 254, disposed on the printed circuit board 300, with the fifth driver IC 235 and the sixth driver IC 236 disposed on the liquid crystal display panel 100. Also, the sixth via line TL6 and the eighth via line TL8 extend from the liquid crystal display panel 100 to the printed circuit board 300 via the second flexible printed circuit board 420 to electrically connect the third op-amp 253 and the fourth op-amp 254 with the sixth repair line RRL4 and the fifth repair line RRL3, respectively, as shown in FIG. 4.

Figure 5:
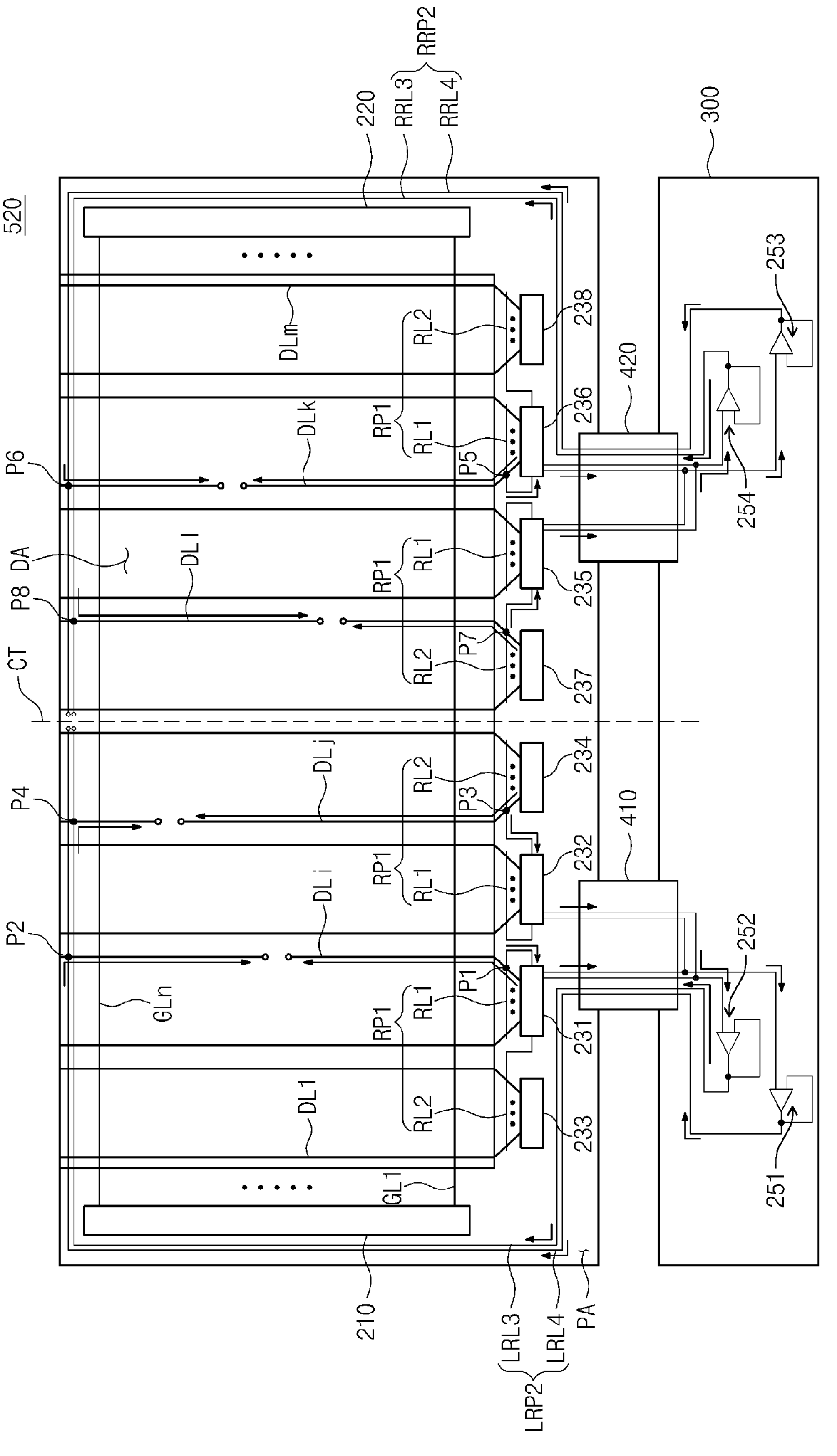
FIG. 5 is a plan view illustrating a repair process of the liquid crystal display according to the alternative exemplary embodiment of the present invention shown in FIG. 4.

FIG. 5 is a plan view illustrating a repair process of the liquid crystal display according to the alternative exemplary embodiment of the present invention shown in FIG. 4. In FIG. 5, a repair process will be described assuming that an i-th data line DLi, a j-th data line DLj, a k-th data line DLk, and an l-th data line DL1 are disconnected, e.g., are separated. Further, arrows in FIG. 5 indicate directions of signal paths therein.

Referring to FIG. 5, in a repair process of the i-th data line DLi, a first end of the i-th data line DLi is electrically connected to the first repair line RL1 which crosses the i-th data line DLi at a first point P1. More specifically, a laser beam, for example, is irradiated onto the first point P1 at which the i-th data line DLi crosses the first repair line RL1, and the i-th data line DLi is thereby electrically connected to the first repair line RL1. As shown in FIG. 5, the i-th data line DLi is arranged in the left side of the liquid crystal display panel 100, and a second end of the i-th data line DLi is electrically connected to the fourth repair line LRL4 of the left-side repair line part LRP2 at a second point P2.

After the repair process for the i-th data line DLi is performed, as described above, the first driver IC 231 to which the i-th data line DLi is connected outputs a corresponding data signal to the i-th data line DLi to display an image. The data signal applied to the i-th data line DLi is applied to the first repair line RL1 through the first point P1. Thus, the data signal is inputted to the first repair input terminal of the first driver IC 231 via the first repair line RL1. In an exemplary embodiment, the first repair input terminal and the first repair output terminal of the first driver IC 231 are electrically connected to each other, e.g., within the first driver IC 231, and the first repair output terminal therefore outputs the data signal. The data signal outputted from the first repair output terminal is provided to the first op-amp 251 via the first via line TL1 (see FIG. 4), and the first op-amp 251 amplifies the data signal and outputs the amplified data signal to the second via line TL2 as a first repair signal. Therefore, the first repair signal is applied to the second end of the i-th data line DLi through the second point P2 via the fourth repair line LRL4.

Thus, even when the i-th data line DLi is separated into two parts due to the line disconnection, the separated two parts of the i-th data line DLi are electrically connected to each other through the first repair line LRL1 and the fourth repair line LRL4. As a result, the data signal may be applied to the pixels connected to i-th data line DLi, thereby preventing occurrence of a line-shaped defect, for example, in the liquid crystal display panel 100.

Still referring to FIG. 5, a first end of the disconnected j-th data line DLj is electrically connected to the second repair line RL2 which crosses the j-th data line DLj at a third point P3. The j-th data line DLj is disposed on the left side of the liquid crystal display panel 100, and a second end of the j-th data line DLj is electrically connected to the third repair line LRL3 of the left-side repair line part LRP2 at a fourth point P4.

When the fourth driver IC 234 connected to the j-th data line DLj outputs a corresponding data signal to the j-th data line DLj in order to display the image, the data signal applied to the j-th data line DLj is input to the first repair input terminal of the second driver IC 232 through the second repair line RL2 at the third point P3. Then, the data signal is outputted from the first repair output terminal and provided to the second op-amp 252 through the third via line TL3. The second op-amp 252 amplifies the data signal and outputs the amplified data signal to the fourth via line TL4 as a second repair signal. Thus, the second repair signal is applied to the second end of the j-th data line at the fourth point P4 via the third repair line LRL3.

Accordingly, even when the j-th data line DLj is separated into two parts due to the line disconnection, the separated two parts of the j-th data line DLj are electrically connected to each other through the second repair lines RL2 and the third repair line LRL3. As a result, the data signal is applied to pixels connected to the j-th data line DLj, to thereby prevent an occurrence of the line-shaped defect, for example, in the liquid crystal display panel 100.

Still referring to FIG. 5, a first end of the disconnected k-th data line DLk is electrically connected to the first repair line RL1 which crosses the k-th data line DLk at a fifth point P5. The k-th data line DLk is disposed on the right side of the liquid crystal display panel 100, and a second end of the k-th data line DLk is electrically connected to the sixth repair line RRL4 of the right-side repair line part RRP2 at a sixth point P6.

When the sixth driver IC 236 connected to the k-th data line DLk outputs a corresponding data signal to the k-th data line DLk to display the image, the data signal applied to the k-th data line DLk is provided to the first repair input terminal of the sixth driver IC 236 through the first repair line RL1 at the fifth point P5. Then, the data signal is outputted from the first repair output terminal and provided to the third op-amp 253 through the fifth via line TL5. The third op-amp 253 amplifies the data signal and outputs the amplified data signal to the sixth via line TL6 as a third repair signal. Thus, the third repair signal is applied to the second end of the k-th data line DLk at the sixth point P6 via the sixth repair line RRL4.

Accordingly, the data signal is applied to pixels connected to the k-th data line DLk, and a line-shaped defect, for example, in the liquid crystal display panel 100 is effectively prevented.

A first end of the disconnected l-th data line DL1 is electrically connected to the second repair line RL2 which crosses the l-th data line DL1 at a seventh point P7. The l-th data line DL1 is disposed on the right side of the liquid crystal display panel 100, and a second end of the l-th data line DL1 is electrically connected to the fifth repair line RRL3 of the right-side repair line part RRP2 at an eighth point P8.

When the seventh driver IC 237 connected to the l-th data line DL1 outputs a corresponding data signal to the l-th data line DL1 in order to display the image, the data signal applied to the l-th data line DL1 is input to the first repair input terminal of the fifth driver IC 235 at the seventh point P7 through the second repair line RL2. Then, the data signal is output from the first repair output terminal and provided to the fourth op-amp 254 through the seventh via line TL7. The fourth op-amp 254 amplifies the data signal and outputs the amplified data signal to the eighth via line TL8 as a fourth repair signal. Thus, the fourth repair signal is applied to the second end of the l-th data line DL1 at the eighth point P8 via the fifth repair line RRL3.

Accordingly, the data signal is applied to pixels connected to the l-th data line DL1 thereby preventing an occurrence of a line-shaped defect, for example, in the liquid crystal display panel 100.

As shown in FIG. 5, the left-side repair line part LRP2 and the right-side repair line part RRP2 are disposed on the left side and the right side of the liquid crystal display panel 100 with reference to the center line CT, respectively, and defects in up to four data lines of the liquid crystal display panel 100 can be repaired in the LCD 520 according to an exemplary embodiment of the present invention.

Thus, according to exemplary embodiments of the present invention as described herein, driver ICs arranged on a display panel are grouped according to a number of flexible printed circuit boards. Therefore, some driver ICs included in each group receive an image signal from a corresponding flexible printed circuit board, and remaining driver ICs receive portions of the image signal provided to adjacent driver ICs.

Thus, a number of the flexible printed circuit boards in the display apparatus is substantially decreased and/or effectively reduced, thereby substantially increasing a productivity, e.g., a production efficiency, of the display apparatus according to an exemplary embodiment. In addition, since the number of the flexible printed circuit boards is based on the number of the driver ICs, delay of the image signal provided to the driver ICs is effectively reduced, thereby improving an image display quality.

Further, a first repair line part and a second repair line part which cross first ends and second ends, respectively, of the data lines are electrically connected to each other through driver ICs which directly receive the image signal from the corresponding flexible printed circuit board. Thus, a repair process which repairs separated data lines, thereby preventing a line-shaped defect, for example, is effectively and easily performed.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit and/or scope of the present invention as defined by the following claims.

What is claimed is:

1. A display apparatus comprising:

a display panel including a plurality of gate lines and a plurality of data lines, data lines of the plurality of data lines being insulated from and intersecting gate lines of the plurality of gate lines, the gate lines configured to receive a gate signal and the data lines configured to receive a data signal to display an image;

a plurality of driver integrated circuits disposed on the display panel and electrically connected to the data lines to convert an image signal to the data signal based on a control signal;

a printed circuit board which outputs the control signal and which controls drive operations of driver integrated circuits of the plurality of driver integrated circuits and the image signal; and a plurality of flexible printed circuit boards disposed on the display panel and the printed circuit board to apply the control signal and the image signal from the printed circuit board to the driver integrated circuits disposed on the display panel, wherein a total number of flexible printed circuit boards of the plurality of flexible printed circuit boards is equal to n/2, n being a natural number, and a total number of the drive integrated circuits of the plurality of drive integrated circuits is 2n, driver integrated circuits of the second driver group are directly connected to adjacent driver integrated circuits of the first driver group, the data lines are divided into a first group of data lines and a second group of data lines, driver integrated circuits of the first driver group are directly connected to corresponding flexible printed circuit boards of the plurality of flexible printed circuit boards, driver integrated circuits of the second driver group are connected to adjacent driver integrated circuits, each driver integrated circuit of the first driver group outputs a first repair signal to at least one data line of the first group of data lines, the first group of data lines corresponding to the first driver group, and each driver integrated circuit of the second driver group outputs a second repair signal to at least one data line of the second group of data lines, the second group of data lines corresponding to the second driver group.

2. The display apparatus of claim 1, further comprising a repair part disposed on the display panel, the repair part comprising:

a first repair line part which at least partially overlaps first ends of the data lines; and a second repair line part which at least partially overlaps second ends of the data lines, the second ends of the data lines disposed opposite the first ends of the data lines.

3. The display apparatus of claim 2, wherein each of the driver integrated circuits of the first driving group comprises a first repair input terminal, a second repair input terminal, a first repair output terminal and a second repair output terminal.

4. The display apparatus of claim 3, wherein the first repair line part comprises:

a first repair line electrically connected to the first repair input terminal of each of the driver integrated circuits of the first driver group, the first repair line at least partially overlapping the first ends of the data lines of the first group of data lines; and a second repair line electrically connected to the second repair input terminal of each of the driver integrated circuits of the first driver group, the second repair line at least partially overlapping the first ends of the data lines of the second group of data lines.

5. The display apparatus of claim 4, wherein the second repair line part comprises:

a third repair line electrically connected to the first repair output terminal of each of the driver integrated circuits of the first driver group, the third repair line disposed along a periphery of a display area of the display panel and at least partially overlapping the second ends of the data lines; and a fourth repair line electrically connected to the second repair output terminal of each of the driver integrated circuits of the first driver group, the fourth repair line disposed along the periphery of the display area of the display panel and at least partially overlapping the second ends of the data lines.

6. The display apparatus of claim 5, wherein when a data line of the first group of data lines includes a disconnection the first end of the data line of the first group having the disconnection is electrically connected to the first repair line, the second end of the data line of the first group having the disconnection is electrically connected to the third repair line, and the first repair signal output from a corresponding driver integrated circuit of the first driver group is applied to the data line having the disconnection via the first repair line and the third repair line.

7. The display apparatus of claim 5, wherein when a data line of the second group of data lines includes a disconnection the first end of the data line of the second group having the disconnection is electrically connected to the second repair line, the second end of the data line of the second group having the disconnection is electrically connected to the fourth repair line, and the second repair signal output from an adjacent driver integrated circuit of the first driver group is applied to the data line of the second group having the disconnection via the second repair line and the fourth repair line.

8. The display apparatus of claim 5, wherein the repair part further comprises a first via line and a second via line each disposed on the flexible printed circuit board and the printed circuit board, wherein the first via line and the second via line electrically connect the first repair output terminal and the second repair output terminal, respectively, of each of the driver ICs of the first driver group with the third repair line and the fourth repair line, respectively, disposed on the display panel.

9. The display apparatus of claim 5, wherein the repair part further comprises an amplifier part which amplifies a signal input from the first repair line part and provides an amplified signal to the second repair line part.

10. The display apparatus of claim 9, further comprising a plurality of the amplifier parts, wherein each driver IC of the first driver group includes one of the amplifier parts of the plurality of amplifier parts.

11. The display apparatus of claim 10, wherein each of the amplifier parts comprises:

a first operational amplifier disposed between the first repair input terminal and the first repair output terminal, wherein the first operational amplifier amplifies a signal input from the first repair input terminal and outputs the amplified signal to the first repair output terminal; and a second operational amplifier disposed between the second repair input terminal and the second repair output terminal, wherein the second operational amplifier amplifies a signal input from the second repair input terminal and outputs an amplified signal to the second output terminal.

12. The display apparatus of claim 5, wherein the data lines are further divided into a left-side data line group disposed on a left portion of the display panel with respect to a center of the display panel and a right-side data line group opposite the left-side data line group, and the second repair line part further comprises:

a left-side repair line part configured to repair the left-side data line group; and a right-side repair line part configured to repair the right-side data line group.

13. The display apparatus of claim 12, wherein the left-side repair line part comprises:

a first left-side repair line connected to a corresponding first repair output terminal, the first left-side disposed along the periphery of the display area of the display panel and at least partially overlapping the second ends of data lines of the left-side data line group; and a second left-side repair line connected to a corresponding second repair output terminal, the second left-side repair line disposed along the periphery of the display area of the display panel and at least partially overlapping the second ends of data lines the left-side data line group, and the right-side repair line part comprises:

a first right-side repair line connected to a corresponding first repair output terminal, the first right-side repair line disposed along the periphery of the display area of the display panel and at least partially overlapping the second ends of data lines of the right-side data line group; and a second right-side repair line connected to a corresponding second repair output terminal, the second right-side repair line disposed along the periphery of the display area of the display panel and at least partially overlapping the second ends of data lines of the right-side data line group.

14. The display apparatus of claim 13, wherein the first left-side repair line and the second left-side repair line are each electrically insulated from the first right-side repair line and the second right-side repair line, respectively.

15. The display apparatus of claim 1, wherein n is an even number greater than or equal to 4.

16. A method of driving a display apparatus, the method comprising:

receiving a control signal and an image signal with a plurality of driver integrated circuits;

converting the image signal to a data signal based on the control signal with the plurality of driver integrated circuits;

outputting the data signal to a plurality of data lines utilizing a plurality of flexible printed circuit boards, a total number of flexible printed circuit boards of the plurality of flexible printed circuit boards is equal to n/2, n being a natural number, and a total number of driver integrated circuits of the plurality of driver integrated circuits is 2n;

displaying an image on the display device based on the data signal;

dividing the plurality of driver integrated circuits into a first group of driver integrated circuits and a second group of driver integrated circuits;

connecting, when a first data line of the plurality of data lines which corresponds to a driver integrated circuit of the first group of driver integrated circuit is disconnected, opposite ends of the first data line to a first repair line branching from the driver integrated circuit of the first group which corresponds to the first data line;

providing a first repair signal output to the driver integrated circuit of the first group to the first data line; and connecting, when a second data line of the plurality of data lines corresponding to a driver integrated circuit of the second group of driver integrated circuits is disconnected, opposite ends of the second data line to a second repair line branching from the driver integrated circuit corresponding to the second data line; and providing a second repair signal output to the driver integrated circuit corresponding to the second data line to the second data line.

17. A display apparatus comprising:

a display panel including a plurality of gate lines, a first group of data lines and a second group of data lines disposed thereon;

a first group of driver integrated circuits and a second group of driver integrated circuits mounted on the display panel and electrically connected to the first group of data lines and the second group of data lines, respectively; and a plurality of flexible printed circuit boards arranged in the display panel, wherein a total number of flexible printed circuit boards of the plurality of flexible printed circuit boards is equal to n/2, n being a natural number, and a total number of the first group of driver integrated circuits and the second group of driver integrated circuits is 2n, the first group of driver integrated circuits is directly connected to a corresponding flexible printed circuit board to output a first repair signal to a data line of the first group of data lines, and the second group of driver integrated circuits outputs a second repair signal from an adjacent driver integrated circuit of the second group of driver integrated circuits to a data line of the second group of data lines.

* * * * *